July 22, 1958        R. C. DANTA        2,844,038
BI-DIRECTIONAL MECHANICAL LIMIT STOP
SYSTEM OR THE LIKE
Filed May 4, 1955

ROBERT C. DANTA
INVENTOR.

BY

HIS ATTORNEY

United States Patent Office 2,844,038
Patented July 22, 1958

2,844,038

BI-DIRECTIONAL MECHANICAL LIMIT STOP SYSTEM OR THE LIKE

Robert C. Danta, Inglewood, Calif., assignor to Hoffman Electronics Corporation, a corporation of California Application May 4, 1955, Serial No. 505,925

4 Claims. (Cl. 74—10.2)

This invention is related to bi-directional mechanical limit stop systems adaptable for either manual or electric drives, and more particularly to an improved bi-directional mechanical limit stop system which will be reliable, of rugged construction, and suitable for gear ratios as high as 1:10,000.

In the past, many types of bi-directional mechanical limit stop systems have been devised. Systems currently in use appear to be deficient in some respects. In many systems, for example, when the opposite ends of travel are reached by the system the gear teeth or cooperating gears are disposed in shear. Therefore, gear reductions greater than 20:1 become impractical since, beyond this ratio, the danger of shearing off gear teeth becomes quite formidable. In other systems in which a traveler element is disposed to run along a predetermined length of the threaded portion of a driver shaft, the versatility of the system employed in terms of maximum limits obtainable is restricted by the overall length of the threaded portion of the driver shaft and by the pitch of the threads. In addition, the foregoing type of system is, by virtue of its design, very weak structurally.

Therefore, it is an object of the present invention to provide a new and useful bi-directional mechanical limit stop system.

It is a further object of the present invention to provide a new and useful bi-directional mechanical limit stop system which will be very rugged structurally, adaptable for gear ratios approaching 1:10,000, and of such design as to preclude the possibility of placing gear teeth of cooperating gears in shear.

According to the present invention, a driver shaft with a stop ring mounted thereupon is intercoupled with and disposed parallel to a driven shaft with a pawl gear mounted thereupon. The stop ring is provided with a stop tooth. The pawl gear is provided with a pawl which rotates about its gear axis 270° to butt against the stop tooth in either of two directions 90° removed, both directions being tangential to the periphery of the aforementioned stop ring. By such a construction, the line of force common to the contact of the aforementioned stop tooth and pawl passes radially through the aforementioned driven shaft upon which the pawl gear and pawl are mounted. Therefore, cooperating gear teeth are not placed in shear when either of the two limits is reached, and, accordingly, gear ratios of 10,000 to 1 may be safely utilized.

The features of the present invention which are believed to be novel are set forth with particularity in the appended claims. The present invention, both as to its organization and manner of operation, together with further objects and advantages thereof, may best be understood by reference to the following description, taken in connection with the accompanying drawing, in which:

Figures 1, 2:
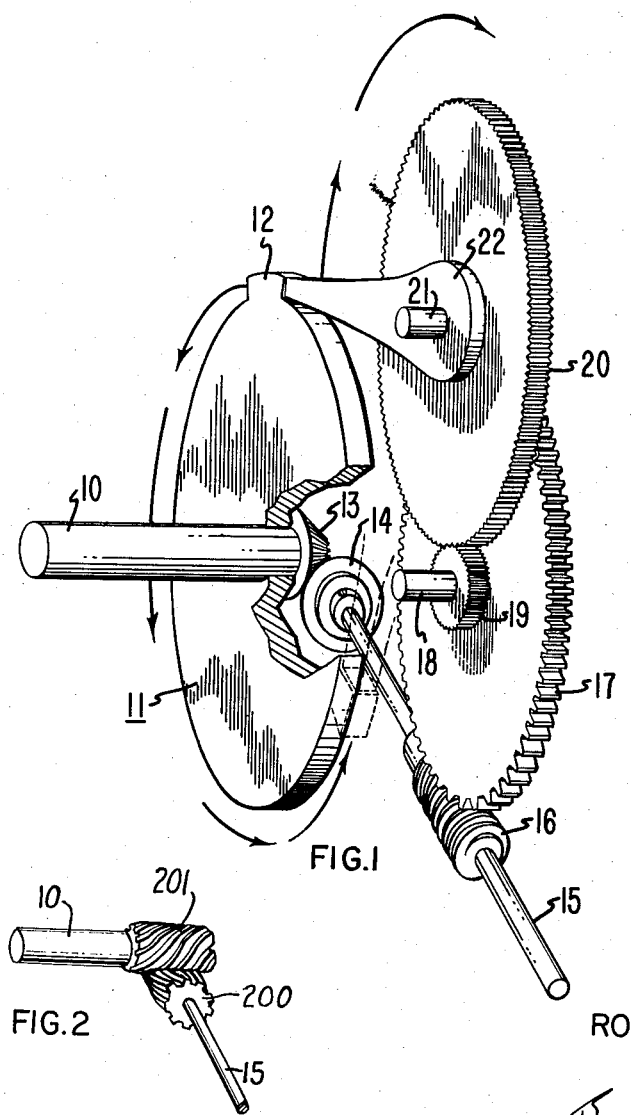
Figure 1 is a perspective elevational view of a bi-directional mechanical limit stop system according to the present invention.
Figure 2 is a perspective view of a portion of the apparatus of Figure 1 in which 45° helical gears are employed.

In Figure 1, driver shaft 10 may be manually or electrically driven, and is provided with stop ring 11. Stop ring 11 may be affixed to driver shaft 10 by means of a taper pin or other suitable retaining element. Stop ring 11 is provided with a peripheral stop tooth 12. Since the height of stop tooth 12 will have some effect upon the maximum permissible gear reduction, the height of stop tooth 12 may be made as little as four-thousandths of an inch if the invention is in fact to be employed with gear reductions of high magnitude. Bevel gear 13 is also mounted upon driver shaft 10 and is adapted to cooperate with bevel gear 14, mounted upon worm shaft 15. Worm shaft 15 also accommodates worm 16, which cooperates with worm gear 17 mounted upon shaft 18. Reduction gear 19, mounted coaxially with worm gear 17 upon shaft 18, cooperates with gear 20, mounted upon driven shaft 21. Pawl 22 is fixedly disposed with respect to gear 20 and rotates with gear 20 about the axis of driven shaft 21. If desired, pawl 22 may be made integral with gear 20, and the combination mounted upon the end of driven shaft 21 by means of a set screw.

The bi-directional limit stop system of Figure 1 operates as follows. As has been indicated, driver shaft 10 may be driven either manually or electrically. Bevel gears 13 and 14 translate the axis of rotation of driver shaft 10 in the direction of the axis of worm shaft 15. If 1 to 1 gear ratios are desired at this point in the gear train construction, cooperating miter gears or 45° helical gears may be employed in lieu of bevel gears 13 and 14. Worm gear 17 cooperates with worm 16 and drives, through reduction gear 19, gear 20. A gear reduction of 10,000:1 is easily attainable by appropriate selection of gears. Pawl 22 moves in accordance with the rotation of gear 20 so as to engage at one end of travel stop tooth 12 of stop ring 11 as shown in Figure 1. It is to be noted that the direction of force of the end of pawl 22 upon stop tooth 12 is in a direction tangential to stop ring 11 and intersects the axis of driven shaft 21. Hence, shaft 21 and not the gears performs the work in stopping the rotation of driver shaft 10.

The same type of positive stop in the other direction is illustrated by the dotted configuration of stop tooth 12 and stop pawl 22. Again, the entire stopping thrust is absorbed by the mountings of driven shaft 21. This again precludes the shearing of gear teeth of the system.

It will of course be understood that two, cooperating, 45° helical gears 200 and 201 may be employed as shown in Figure 2 in lieu of bevel gears 13 and 14 in Figure 1.

This invention is to be understood to include all limit stop systems, of the type described, in which torque producing force components upon gear 20 produced by the contact of pawl 22 and stop tooth 12 are reduced below the torque threshold likely to effect serious gear teeth shear.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A bi-directional mechanical limit stop system adaptable for either manual or electric drives including, in combination, a driver shaft; a stop ring mounted upon said driver shaft, said stop ring having a stop tooth; a first gear also mounted upon said driver shaft; a driven shaft disposed parallel to said driver shaft; a second gear mounted upon said driven shaft and mechanically coupled to said first gear by separate gear means; and pawl means fixedly disposed with respect to said second gear and engageable with said stop tooth in a thrust relationship in either of two directions substantially tangential to said stop ring.

2. Apparatus according to claim 1 in which said first gear comprises a first bevel gear, and said separate gear means includes a second shaft, a second bevel gear mounted upon said second shaft and adapted to cooperate with said first bevel gear, a worm also mounted upon said second shaft, a worm gear shaft, a worm gear mounted upon said worm gear shaft adapted to cooperate with said worm and having a reduction gear portion adapted to cooperate with second gear mounted upon said driven shaft.

3. Apparatus according to claim 1 in which said first gear comprises a first 45° helical gear, and said separate gear means comprises a second shaft, a second 45° helical gear mounted upon said second shaft and adapted to cooperate with said first helical gear, a worm also mounted upon said second shaft, a worm gear shaft, a worm gear mounted upon said worm gear shaft adapted to cooperate with said worm and having a reduction gear portion adapted to cooperate with said second gear.

4. Apparatus according to claim 1 in which said separate gear means mechanically coupling said first and second gears is comprised of a gear reduction means.

References Cited in the file of this patent

UNITED STATES PATENTS

| | | |
|---|---|---|
| 1,203,840 | Bailey | Nov. 7, 1916 |
| 2,396,714 | May | Mar. 19, 1946 |